United States Patent
Nakano et al.

(10) Patent No.: US 6,838,111 B2
(45) Date of Patent: Jan. 4, 2005

(54) SOYMILK AND TOFU MANUFACTURING METHOD

(75) Inventors: Takao Nakano, Gyoda (JP); Shigeki Kawashima, Gyoda (JP); Masaki Sato, Gyoda (JP)

(73) Assignee: Asahi Food Processing Co., Ltd., Tokyo (JP)

( * ) Notice: Subject to any disclaimer, the term of this patent is extended or adjusted under 35 U.S.C. 154(b) by 330 days.

(21) Appl. No.: 10/058,738

(22) Filed: Jan. 30, 2002

(65) Prior Publication Data

US 2002/0176925 A1 Nov. 28, 2002

(30) Foreign Application Priority Data

Mar. 12, 2001 (JP) .................................. 2001-068104

(51) Int. Cl.[7] .................................................. A23L 3/22
(52) U.S. Cl. ..................... 426/598; 426/495; 426/634; 426/521
(58) Field of Search ................................ 426/590, 598, 426/599, 629, 490, 491, 495, 519–521, 634

(56) References Cited

U.S. PATENT DOCUMENTS

| | | | | |
|---|---|---|---|---|
| 3,765,090 A | * | 10/1973 | Roberts et al. | 426/38 |
| 3,901,978 A | * | 8/1975 | Nelson et al. | 426/565 |
| 4,041,187 A | | 8/1977 | Nelson et al. | 426/598 |
| 5,807,602 A | * | 9/1998 | Beutler et al. | 426/598 |
| 5,863,590 A | * | 1/1999 | Alan et al. | 426/634 |

FOREIGN PATENT DOCUMENTS

| | | | |
|---|---|---|---|
| JP | 4834224 | * | 10/1973 |
| JP | 63-63358 | | 3/1988 |
| JP | 63063358 | * | 3/1988 |
| JP | 5-244866 | | 9/1993 |
| JP | 11-089532 | | 4/1999 |

OTHER PUBLICATIONS

Database WPI, Section Ch, Derwent Publications Ltd., London, GB; AN 1973–65343U XP002248421, "Heating soybean protein solution", & JP 48 034224 B (Nisshin Oil Mills Co., Ltd.), abstract.

Database WPI, Section Ch, Week 199738 Derwent Publications, Ltd., London, GB; AN 1997–403404 XP 002248420 & CN 1 113 121 A (Jiamusi City Milk Co.), Dec. 13, 1995, abstract.

Steve Chen et al., "Preparation of Fluid Soymilk", American Soybean Association, pp. 341–352, Oct. 1988.

A.P. Gandhi, "Soymilk—A Potential Supplement for Dairy Milk", Indian Food Industry, vol. 19(6), pp. 392–397, Dec. 2000.

English Translation of KR 2000–0035393 published Jun. 26, 2000.

* cited by examiner

Primary Examiner—Drew Becker
(74) Attorney, Agent, or Firm—Wenderoth, Lind & Ponack, L.L.P.

(57) ABSTRACT

Soymilk and tofu manufacturing method increases a ratio of fine soymilk particles to provide soymilk and tofu that have no grassy smell and are excellent in the taste and flavor, especially in the rich and milky taste. Raw material soybeans are dipped in softened water and ground while softened water is being added. Soy pulp thereof is separated to obtain soymilk. A high temperature, reduced pressure treatment is applied wherein the soymilk is first heated to 120 to 150° C. and then the pressure is reduced to −0.05 to −0.08 MPa. Thereafter, a high pressure treatment is applied wherein a double tube type heating device is employed, the soymilk flows within an inner tube and heating medium flows in a space between the inner tube and outer tube and the soymilk is treated under a pressure of 5 to 15 MPa and a temperature of 70 to 100° C. Or, a high pressure homogenizer is used and the soymilk is treated under a pressure of 20 to 150 MPa and a temperature of 70 to 80° C.

4 Claims, 2 Drawing Sheets

SOYMILK AND TOFU MANUFACTURING METHOD

BACKGROUND OF THE INVENTION

1. Field of the Invention

The present invention relates generally to a soymilk and tofu, or bean curd, manufacturing method and, more particularly, to a method for manufacturing such soymilk and tofu as have no grassy smell and are excellent in taste and flavor, especially in the generally accepted rich and milky taste.

2. Description of the Prior Art

In the prior art method for manufacturing soymilk and tofu, soybeans as raw material, after they have been dipped in water, are usually ground while they are being added with water, so that soybean slurry may be obtained. Then, the soybean slurry is heated and soy pulp, or "okara", is separated therefrom, so that soymilk of a temperature of 70 to 90° C. may be obtained. Then, an appropriate quantity of coagulant is added thereinto and agitation is done for coagulation and tofu is obtained.

Also, in order to obtain a tasty and high quality soymilk by ultra-finely breaking soymilk particles into particle sizes of 0.2 to 0.5 $\mu$m, it is disclosed that soymilk, after the soy pulp has been separated therefrom, is applied with a heating treatment under a pressure of 0.2 to 0.3 MPa and a temperature of 105 to 110° C. and then applied with a homogenizing treatment by a homogenizer under a pressure of 20 to 50 MPa and a temperature of 85 to 90° C. (the Japanese laid-open patent application Sho 63–63358).

However, in this prior art method for manufacturing the soymilk, the heating temperature is low and removal of the grassy smell is not sufficient. Also, the heating treatment, that is done before the homogenizing treatment, is assumed to be carried out by a batch type treatment in which, for example, an autoclave is used and this does not suit a production in a large quantity.

Also, a soymilk manufacturing method is disclosed in which an ultra-high pressure is used such that a pressure of 300 to 500 MPa is applied to the soymilk for ten minutes after the soy pulp has been separated but before the heating treatment is done (the Japanese laid-open patent application Hei 5-244866). But, even in the soymilk obtained by this method, the grassy smell is not sufficiently removed and moreover the milky taste also is not sufficiently attained.

Thus, it is an object of the present invention to provide a soymilk and tofu manufacturing method in which a ratio of finely broken soymilk particles is increased and thereby such soymilk and tofu as have no grassy smell and are excellent in taste and flavor, especially in a rich and milky taste, can be obtained.

SUMMARY OF THE INVENTION

In order to achieve the abovementioned object, the soymilk and tofu manufacturing method according to the present invention carries out, with respect to soymilk obtained after soy pulp thereof has been separated from soybean slurry, a high temperature, reduced pressure treatment in which the soymilk is first heated to a high temperature and then pressure thereof is reduced and thereafter carries out a high pressure treatment, so that a ratio of soymilk particles of the size of 1 $\mu$m or less is increased.

In the high temperature, reduced pressure treatment carried out in the soymilk and tofu manufacturing method according to the present invention, it is preferable that the mentioned high temperature is 120 to 150° C. and the pressure is reduced to –0.05 to –0.08 MPa.

Also, in the high pressure treatment carried out in the soymilk and tofu manufacturing method according to the present invention, a double tube type heating device, having an inner tube and an outer tube, may be employed in which the soymilk flows within the inner tube and a heating medium flows in a space between the inner tube and the outer tube and the soymilk is treated under a pressure of 5 to 15 MPa and a temperature of 70 to 100° C. Or, instead thereof, a high pressure homogenizer may be employed and the soymilk is treated under a pressure of 20 to 150 MPa and a temperature of 70 to 80° C.

According to the soymilk and tofu manufacturing method of the present invention, in the soymilk obtained by applying the abovementioned high temperature, reduced pressure treatment and high pressure treatment, the ratio of the soymilk particles of 1 $\mu$m or less can be increased and thereby manufacture of the soymilk and tofu having a milky taste becomes possible.

Also, according to the soymilk and tofu manufacturing method of the present invention, in the soymilk and tofu obtained by applying the abovementioned high temperature, reduced pressure treatment, that is preferably done with the temperature of approximately 120 to 150° C., a hexanal content can be reduced to approximately 0.4 ppm. That is, while the hexanal or hexanol content is considered a component to cause the generally unpleasant grassy smell, it is included in the soymilk, manufactured according to the prior art method, in the amount of approximately 1.7 ppm of hexanal and/or approximately 1.0 ppm of hexanol. Thus, soymilk and tofu that have no grassy smell and are excellent in the taste and flavor can be obtained.

In the soymilk and tofu manufacturing method according to the present invention, it is preferable to use softened water, especially distilled water, as dip water into which the raw material soybeans are dipped for producing the soybean slurry and addition water added while the soybeans are being ground. By so using the softened water as the dip water of the raw material soybeans and the addition water at the time of grinding the soybeans, a synergistic effect with the effect of finely breaking the soymilk particles by the abovementioned high temperature, reduced pressure treatment and high pressure treatment can be obtained, the ratio of the particles of 1 $\mu$m or less in the soymilk thus obtained can be further increased and soymilk and tofu having a more milky taste can be obtained.

Thus, according to the method of the present invention, such soymilk and tofu as have no grassy smell and are excellent in the taste and flavor, especially in the rich and milky taste, can be obtained.

DESCRIPTION OF THE PREFERRED EMBODIMENTS

In the soymilk and tofu manufacturing method according to the present invention, soybeans as raw material are first washed by water and then dipped into water, preferably into softened water or more preferably into distilled water, for a predetermined time to be swollen. The soybeans so swollen are ground, while they are being added with water, preferably with softened water or more preferably with distilled water, and then digested at a temperature of 70 to 80° C. so that soybean slurry may be obtained. Then, the soybean slurry is filtered so that soy pulp and soymilk may be separated from each other.

Operation is done, for example, such that, while the soymilk so obtained flows in a tube, steam is directly blown thereinto and the soymilk is heated preferably to a temperature of 120 to 150° C. It is preferable to select a length of the tube so that the soymilk heated to the temperature of 120 to 150° C. by blowing the steam or by other appropriate means may be held at that temperature for 5 to 10 seconds.

Pressure acting on the soymilk heated to that high temperature is rapidly reduced preferably to −0.05 to −0.08 MPa by flashing in a tank that is kept vacuum or by other appropriate means. By this high temperature, reduced pressure treatment, the soymilk particles are made finer and, at the same time, by the reduced pressure, miscellaneous tastes and smells including the grassy smell are removed together with water of the steam blown for heating the soymilk. Thereby, the grassy smell of the resulted soymilk and tofu can be reduced.

Then, a high pressure treatment is applied in which pressure of the soymilk thus obtained is elevated and the soymilk is injected into a container. Thereby, the ratio of the particles of 1 $\mu$m or less in the resulted soymilk and tofu can be increased substantially to 100%, as compared with approximately 50 to 60% in the soymilk and tofu obtainable by the prior art method.

The abovementioned high pressure treatment can be carried out such that a double tube type heating device, having an inner tube and an outer tube, is employed, the soymilk flows within the inner tube and a heating medium flows in a space between the inner tube and the outer tube and the soymilk is treated under a pressure of 5 to 15 MPa and a temperature of 70 to 100° C. or, instead thereof, a high pressure homogenizer is employed and the soymilk is treated under a pressure of 20 to 150 MPa and a temperature of 70 to 80° C.

Figure 1:
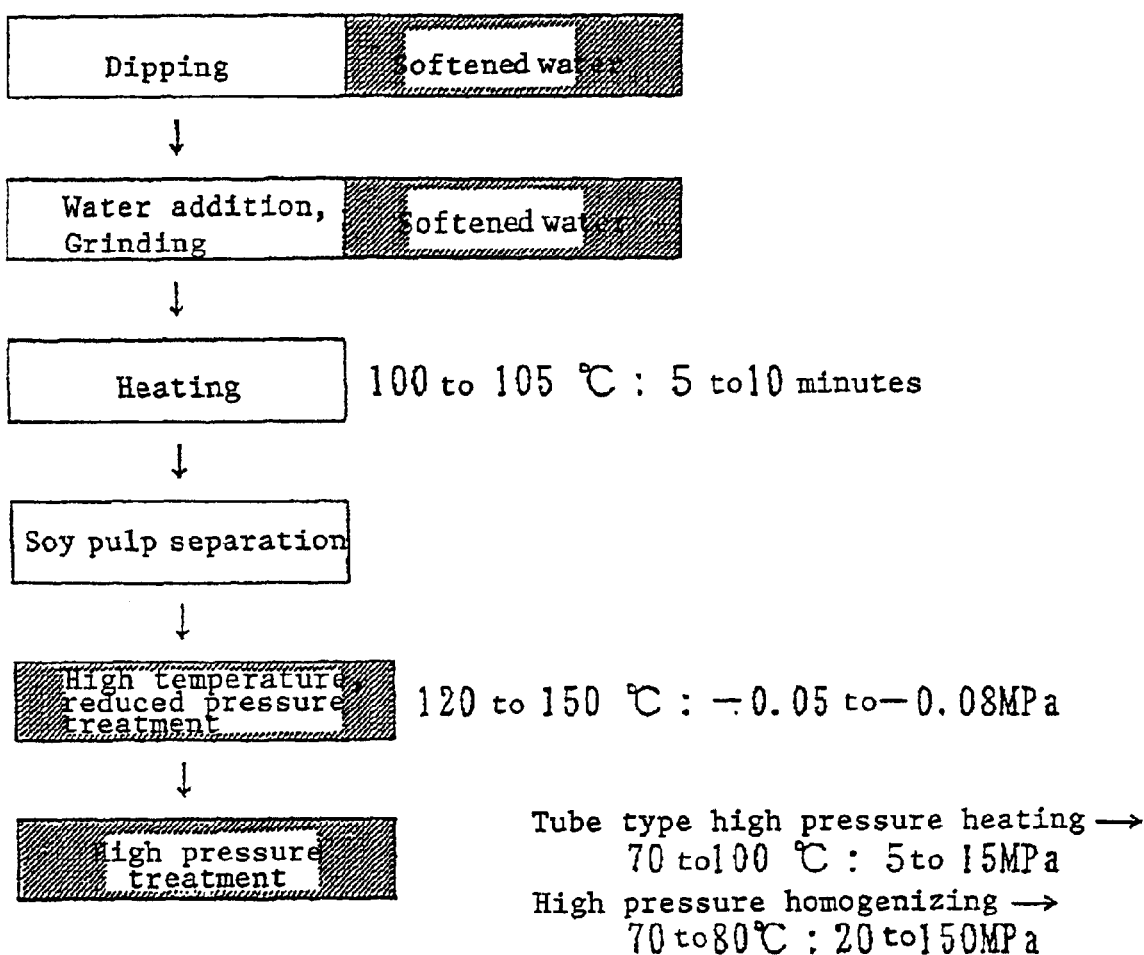
FIG. 1 is a flow diagram showing an operation process of the soymilk and tofu manufacturing method according to the present invention.

Operation process of the soymilk and tofu manufacturing method according to the present invention, as described above, is shown in a flow diagram of FIG. 1.

Figure 2:
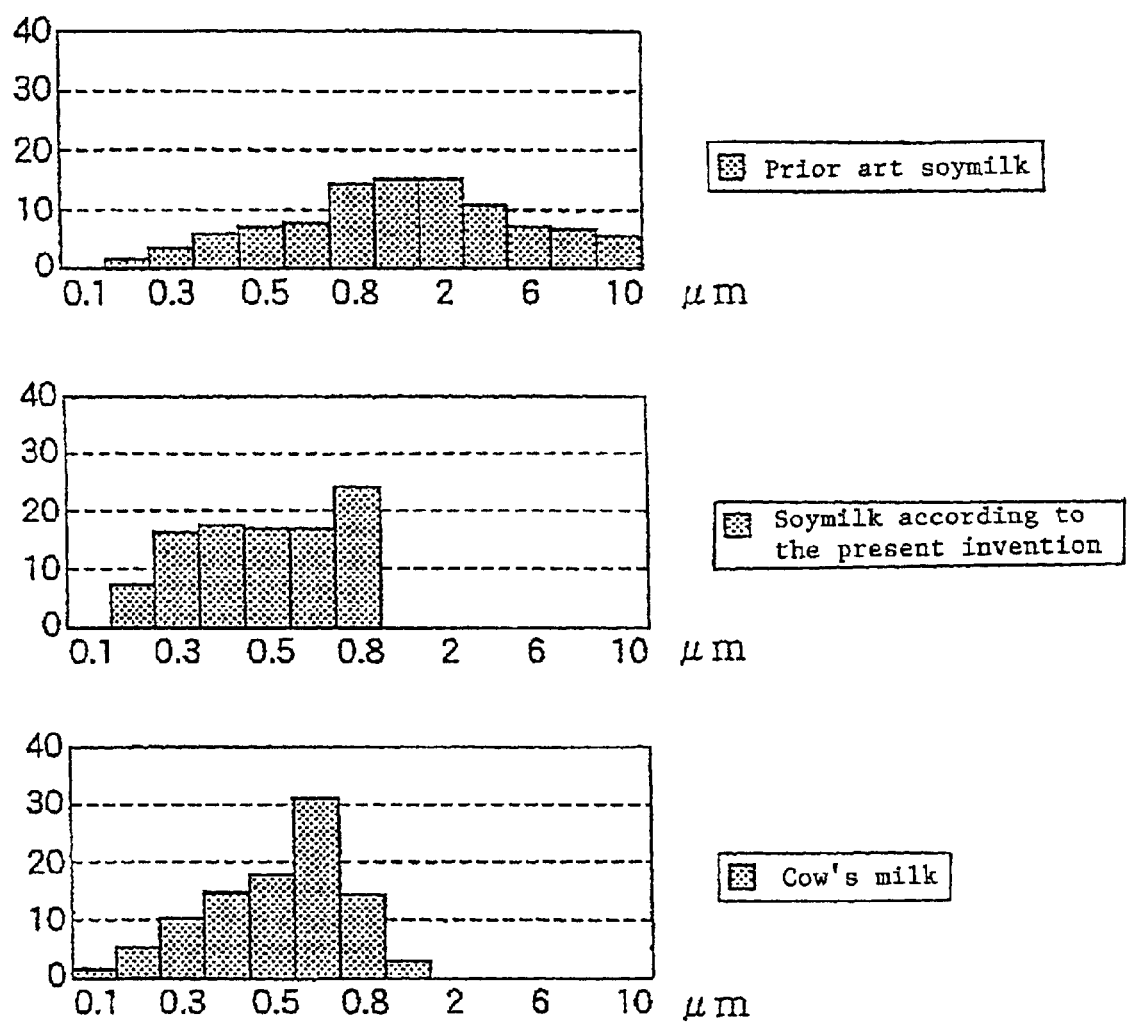
FIG. 2 is a graph showing a particle distribution in the soymilk and tofu obtained by the method of the present invention, in comparison with particle distributions in a prior art soymilk and cow's milk.

Also, one example of a particle distribution of the soymilk and tofu obtained according to the method of the present invention is shown in FIG. 2, in comparison with particle distributions of a prior art soymilk and cow's milk. As is clear from FIG. 2, the particle distribution of the soymilk and tofu obtained by the method of the present invention is very similar to that of cow's milk.

With respect to various soymilk particles obtained according to a use or non-use of the softened water as the dip water of the raw material soybeans and the addition water at the time of grinding the soybeans and also according to an application or non-application of the high temperature, reduced pressure treatment and the high pressure treatment, all as described in the present invention, the ratio of the soymilk particles of 1 $\mu$m or less and a sensory evaluation on the miscellaneous tastes, the grassy smell and the rich and milky taste have been tested and the result is shown in the following Table 1:

TABLE 1

Soymilk Particles and Sensory Evaluation according to the Treatment Method

| Treatment Method | | | | | | |
|---|---|---|---|---|---|---|
| Use of softened water | High Temperature, reduced pressure treatment | High pressure treatment | Ratio of soymilk particles of 1 $\mu$m or less (%) | Sensory Evaluation | | |
| | | | | Miscellaneous tastes | Grassy smell | Rich and milky taste |
| X | X | X | 56% | Much | Much | None |
| ○ | X | X | 70% | A little | Much | A little |
| X | ○ | X | 70% | Much | None | A little |
| X | X | ○ | 64% | Much | Much | A little |
| ○ | ○ | X | 70% | A little | None | A little |
| ○ | X | ○ | 78% | A little | Much | Much |
| X | ○ | ○ | 80% | A little | None | Much |
| ○ | ○ | ○ | 100% | Very little | None | Strong |
| (Reference) Cow's milk | | | 97% | Very little | None | Strong |

Note:
X means "not applicable".
○ means "applicable".

Also, with respect to tofu obtained by the method of the present invention and that obtained on the market, a sensory test has been performed and the result is shown in the following Table 2:

TABLE 2

A: Tofu according to the present invention
B: Tofu on the market

① Color, Appearance   A:B = 5:4 → No significant difference
② Taste, Flavor       A:B = 8:1 → Much significant difference
③ Smoothness          A:B = 7:2 → Much significant difference
④ Overall evaluation  A:B = 8:1 → Much significant difference Main comment
A has a good body.
A has a rich feeling of taste.

Actual Example

Herebelow, an actual example of practicing the present invention will be described.

Whole soybeans of 100 kg were washed by water and dipped in softened water for 10 hours. The soybeans so dipped and swollen to 220 kg were ground while they were gradually added with softened water of 300 lit. The ground object thus obtained was digested for 5 minutes at the temperature of 70 to 80° C. and filtered, so that soymilk of 400 lit. was obtained.

Steam was injected into the tube in which the soymilk was flowing. Thereby, the soymilk was instantly heated to 140 to 150° C. and held for 5 to 10 seconds. Then, the pressure there was rapidly reduced to the vacuum of −0.067 to −0.093 MPa (−500 to −700 mmHg) and the soymilk was cooled to 70 to 80° C. by evaporation of the water content. By the resulted flashing effect, miscellaneous tastes together with the grassy smell were also reduced and, numeric value-wise, removal by 85% thereof was confirmed. The soymilk particles of 1 $\mu$m or less at this point of time was approximately 70%.

Thereafter, the high pressure treatment using a tube type high pressure heating device was carried out under the pressure of 5 to 15 MPa and the temperature of 70 to 100° C. and the soymilk particles were made finer. By this treatment, particles of 1 μm or less in the soymilk obtained became 100%. Thus, the grassy smell was removed and the soymilk became excellent in the taste and flavor, especially in the rich and milky taste.

Magnesium chloride of 0.25 to 0.35% (ratio to the soymilk) as coagulant was added into the soymilk and tofu was obtained. This tofu likewise had no grassy smell and was excellent in the taste and flavor, especially in the rich and milky taste.

While the preferred form of the present invention has been described, it is to be understood that the invention is not limited to the particular one as herein described but embraces such modified forms thereof as come within the scope of the appended claims.

As concretely described above, in the soymilk and tofu manufacturing method according to the present invention, with respect to the soymilk obtained by separating the soy pulp from the soybean slurry, the high temperature, reduced pressure treatment is applied wherein the soymilk is first heated to the high temperature and then the pressure thereof is reduced. Thereafter, the high pressure treatment is applied and the ratio of the soymilk particles of 1 μm or less is increased.

With the increased ratio of the soymilk particles of 1 μm or less in the soymilk obtained by so applying the high temperature, reduced pressure treatment and the high pressure treatment, manufacture of the soymilk and tofu having a rich and milky taste becomes possible.

Also, according to the soymilk and tofu manufacturing method of the present invention, in the soymilk and tofu obtained by applying the high temperature, reduced pressure treatment, the hexanal or hexanol content, that is considered to cause the generally unpleasant grassy smell, can be reduced and thereby the soymilk and tofu having no grassy smell and having a smooth taste can be obtained.

In the soymilk and tofu manufacturing method according to the present invention, if softened water, especially distilled water, is used as the dip water of the raw material soybeans for producing the soybean slurry and the addition water at the time of grinding the soybeans, then a synergistic effect can be obtained with the effect obtained by the fine soymilk particles according to the abovementioned high temperature, reduced pressure treatment and high pressure treatment, and thereby the ratio of the particles of 1 μm or less in the soymilk is further increased and soymilk and tofu having a further rich and milky taste can be obtained.

What is claimed is:

1. A soymilk and tofu manufacturing method, which comprises applying a high temperature, reduced pressure treatment to soymilk obtained by separating soy pulp from soybean slurry, wherein said treatment comprises first heating the soymilk to a temperature of 120 to 150° C. and then reducing a pressure thereof to −0.05 to −0.08 MPa, and thereafter applying a high pressure treatment at 5 to 15 MPa to the resultant soymilk, so that ratio of soymilk particles of 1 μm or less is increased.

2. A soymilk and tofu manufacturing method as claimed in claim 1, which further comprise dipping raw material soybeans in softened water to swell the soybeans, and grinding the swollen soybeans while adding softened water thereto to produce the soybean slurry.

3. A soymilk and tofu manufacturing method as claimed in claim 1, wherein said high pressure treatment is carried out such that a double tube type heating device, having an inner tube and an outer tube, is employed, the soymilk flows within the inner tube and a heating medium flows in a space between the inner tube and the outer tube and the soymilk is treated under a pressure of 5 to 15 MPa and a temperature of 70 to 100° C.

4. A soymilk and tofu manufacturing method claimed in claim 2, wherein said high pressure treatment is carried out such that a double tube type heating device, having an inner tube and an outer tube, is employed, the soymilk flows within the inner tube and a heating medium flows in a space between the inner tube and the outer tube and the soymilk is treated under a pressure of 5 to 15 MPa and a temperature of 70 to 100° C.

* * * * *